US012724685B1

(12) United States Patent
Elverson et al.

(10) Patent No.: US 12,724,685 B1
(45) Date of Patent: Sep. 1, 2026

(54) ANALYTICS-CORRELATION-RUNBOOKS PIPELINE FOR SURFACING ACTIONABLE INSIGHTS

(71) Applicant: Riverbed Technology, LLC, San Francisco, CA (US)

(72) Inventors: Bryan Thomas Elverson, Arlington, MA (US); Jason D. Garrabrant, Somerville, MA (US); Alexander B. Ressler, Lewis Center, OH (US); Richard M. Tworek, Whitewright, TX (US); Ian D. Gregorio-de Souza, Hanover, NH (US); John P. Murphy, Merrimack, NH (US); Adam Hert, Vancouver (CA); Vincent H. Berk, Lyme, NH (US); Andrew Ratin, Newtonville, MA (US); Meena Sivanarayanan, Centreville, VA (US); Jeffrey R. Blank, Cedar Park, TX (US)

(73) Assignee: Riverbed Technology LLC, Redwood City, CA (US)

( * ) Notice: Subject to any disclaimer, the term of this patent is extended or adjusted under 35 U.S.C. 154(b) by 89 days.

(21) Appl. No.: 18/799,284

(22) Filed: Aug. 9, 2024

Related U.S. Application Data

(60) Provisional application No. 63/518,794, filed on Aug. 10, 2023.

(51) Int. Cl.
*G06F 15/173* (2006.01)
*G06F 11/07* (2006.01)
*G06F 11/30* (2006.01)

(52) U.S. Cl.
CPC ...... *G06F 11/3072* (2013.01); *G06F 11/0727* (2013.01)

(58) Field of Classification Search
CPC ......................... G06F 11/3072; G06F 11/0727
USPC .................................................. 709/223–224
See application file for complete search history.

(56) References Cited

U.S. PATENT DOCUMENTS

| | | | | |
|---|---|---|---|---|
| 8,756,301 | B2 * | 6/2014 | Ennis | G06N 5/02 709/223 |
| 11,550,628 | B2 * | 1/2023 | Eschinger | G06F 11/3409 |
| 11,640,348 | B2 * | 5/2023 | Bugdayci | G06F 11/301 709/224 |
| 11,910,137 | B2 * | 2/2024 | Bures | H04Q 9/02 |
| 2010/0083356 | A1 * | 4/2010 | Steckley | H04L 67/125 726/5 |
| 2015/0188768 | A1 * | 7/2015 | Maini | G06F 8/61 709/224 |
| 2021/0191769 | A1 * | 6/2021 | Eschinger | G06F 11/3409 |
| 2023/0062439 | A1 * | 3/2023 | Patti | G06F 11/3466 |

(Continued)

*Primary Examiner* — Bharat Barot
(74) *Attorney, Agent, or Firm* — Laxman Sahasrabuddhe; Park, Vaughan, Fleming & Dowler LLP

(57) ABSTRACT

Measurement data may be received from a set of sensors in a computing infrastructure and stored in a monitoring database. An indicator may be determined when a first measurement is outside a range of expected values. A detection notification may be determined when the indicator matches a detection pattern. A runbook may be executed based on the detection notification, where at least one command in the runbook queries the monitoring database for a second measurement which is different from the first measurement. An actionable insight may be generated based on a result produced by the runbook.

17 Claims, 4 Drawing Sheets

(56) References Cited

U.S. PATENT DOCUMENTS

2023/0258538 A1* 8/2023 Kizu .................. G05B 23/0221
702/189
2024/0410294 A1* 12/2024 Becchio ............. G05B 23/0254

* cited by examiner

ANALYTICS-CORRELATION-RUNBOOKS PIPELINE FOR SURFACING ACTIONABLE INSIGHTS

RELATED APPLICATION

This application claims the benefit of U.S. Provisional Application Ser. No. 63/518,794, filed on 10 Aug. 2023, the contents of which are herein incorporated by reference in their entirety for all purposes.

TECHNICAL FIELD

This disclosure generally relates to computer systems and networks. More specifically, this disclosure relates to analytics-correlation-runbooks pipeline for surfacing actionable insights.

BACKGROUND

A computing infrastructure may refer to a collection of computers and networks used by an organization. Numerous objects (which may include, but are not limited to, users, devices, applications, and networks) may be monitored and a variety of metrics may be collected for each monitored object.

SUMMARY

Measurement data may be received from a set of sensors in a computing infrastructure and stored in a monitoring database. An indicator may be determined (e.g., by an anomaly engine) when a first measurement is outside a range of expected values. A detection notification may be determined (e.g., by a correlation engine) when the indicator matches a detection pattern. A runbook may be executed (e.g., by a runbook engine) based on the detection notification, where at least one command in the runbook may query the monitoring database for a second measurement which is different from the first measurement. An actionable insight may be generated based on a result produced by the runbook.

In some embodiments described herein, the monitoring database may include a main database and a set of distributed databases. Aggregated measurement data may be stored in the main database and low-level measurement data may be stored in the set of distributed databases.

In some embodiments described herein, an anomaly engine may create a time series profile for a monitored metric based on historical measurement data, and the range of expected values may be generated based on the time series profile.

In some embodiments described herein, a correlation engine may define a set of detection patterns corresponding to a set of network events.

In some embodiments described herein, at least one command in the runbook may query an external database which is different from the monitoring database. In some embodiments described herein, the external database may be a configuration management database. In some embodiments described herein, the runbook may annotate an open ticket in the configuration management database.

DETAILED DESCRIPTION

Figure 1:
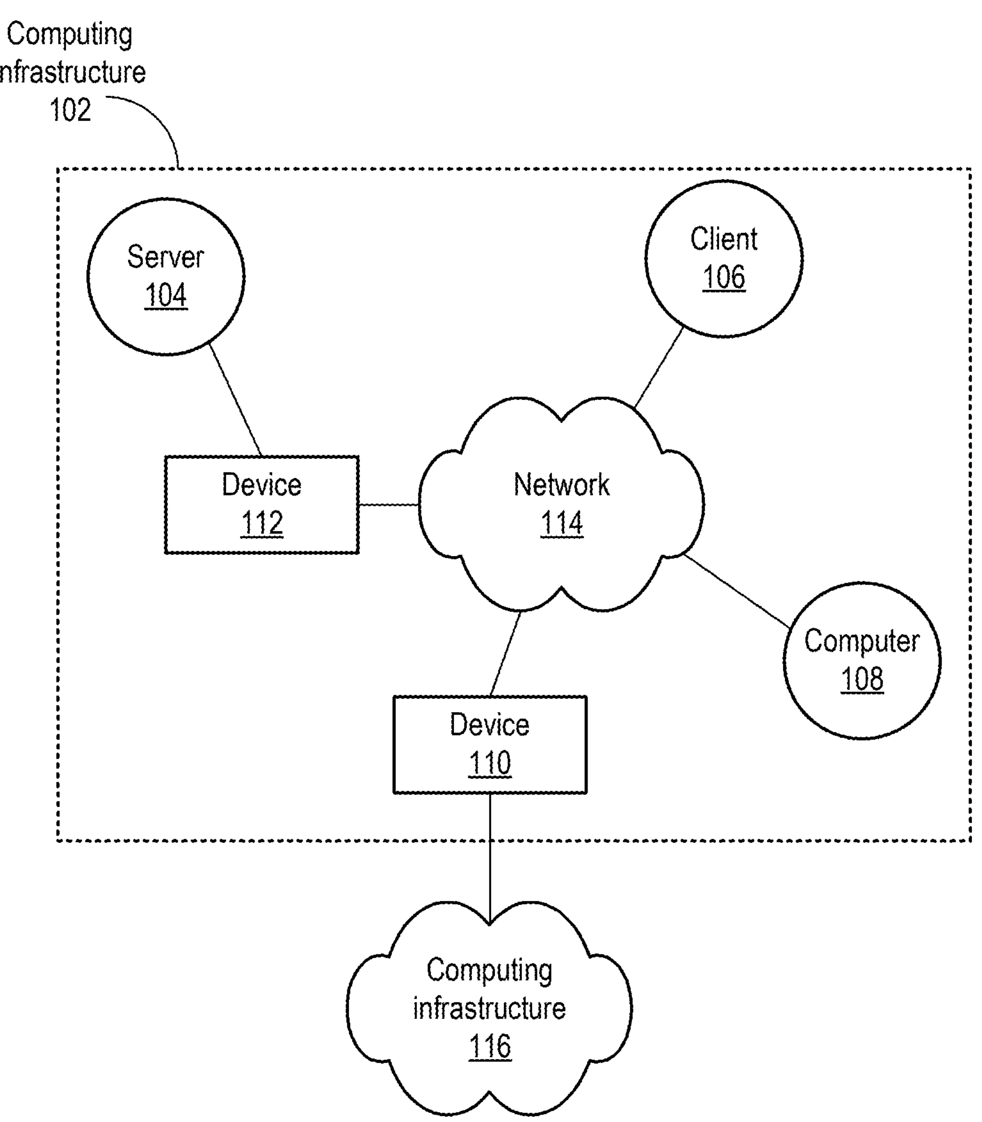
FIG. 1 illustrates a computing infrastructure in accordance with some embodiments described herein.

Aspects of the present disclosure relate to an analytics-correlation-runbooks pipeline for surfacing actionable insights. Approaches which monitor metrics in a computing infrastructure may collect vast amounts of data. Some approaches may run analytics on the collected data and generate an alert when a particular metric on a particular entity is outside an expected range of values. The alerts may be provided to users who may have to correlate and investigate thousands of alerts per day. The resulting alert fatigue may cause most of the alerts to be ignored and may not cause the user to take appropriate action, which may render the whole alerting ecosystem useless. Some approaches may aggregate alerts to reduce the alert fatigue. However, these approaches tend to be very generic and treat the individual alerts without understanding the semantics of the underlying data. As a result, these approaches still generate many alerts and fail to solve the alert fatigue problem.

Embodiments described herein may provide methods and systems for substantially reducing or eliminating alert fatigue by using an analytics-correlation-runbooks pipeline for surfacing actionable insights. Specifically, embodiments described herein may have the ability to go back to the data sources and ask for more data for further investigation while executing the analytics-correlation-runbooks pipeline. Some embodiments described herein may have three parts in the analytics pipeline: (1) indicator detection, (2) correlation, and (3) automated investigations (which is also referred to as "runbooks" in this disclosure). All three parts may work together to produce actionable insights. An insight (and the corresponding alert) may be presented to the user if the entire pipeline agrees that the insight is worthy of the user's attention. Additionally, because of the design of the pipeline, by the time the actionable insight is presented to the user, a lot of supporting details have already been collected. This way, not only do embodiments described herein reduce alert fatigue by filtering out all irrelevant data, but the user is also saved a lot of time and effort in investigating the presented alerts.

Technical advantages of embodiments described herein include, but are not limited to, (1) enabling the user to configure a runbook (e.g., a sequence of commands which may be executed upon the occurrence of a trigger condition) to validate an alert, (2) automatically collecting additional data related to an alert based on executing the runbook, (3) automatically performing one or more validations based on the collected additional data to confirm the importance of the alert before presenting the alert to a user, (4) presenting alerts to a user when the analytics-correlation-runbooks pipeline agrees that the insight is worthy of the user's attention, and (5) reducing or eliminating alert fatigue by substantially reducing the number of alerts provided to a user (without sacrificing accuracy or detectability).

FIG. 1 illustrates a computing infrastructure in accordance with some embodiments described herein.

Examples of computing infrastructures include, but are not limited to, information technology (IT) infrastructures, server farms, and data centers. Computing infrastructure 102 may include server 104, client 106, computer 108, and devices 110 and 112, which may communicate with one another over network 114. Computing infrastructure 102 may be communicatively coupled with other computing infrastructures, e.g., computing infrastructure 102 may be communicatively coupled with computing infrastructure 116 through device 110. The computing infrastructure shown in FIG. 1 is for illustration purposes and is not intended to limit the scope of the disclosure. In general, a computing infrastructure may include thousands or millions of devices.

The term "device" may generally refer to any apparatus that can perform computations and communicate with other devices. In some embodiments, a device can include a processing mechanism that can execute instructions stored on a storage medium. Examples of devices include, but are not limited to, file servers, appliances, routers, switches, smartphones, handheld computers, laptop computers, desktop computers, distributed computers, and printers. The term "network" may refer to multiple interconnected devices. A network can deliver information from one device (e.g., a server) to another device (e.g., a client computer). Examples of networks include, but are not limited to, wireless and wired networks, local area networks (LANs), metropolitan area networks (MANs), WANs, private networks, public networks, intranets, and internets.

Communication between two devices or nodes of a network may be accomplished using a layered software architecture, which may be referred to as a networking software stack or a networking stack. A given functionality in a networking stack can be implemented using hardware or software or a combination thereof. The decision to implement a specific functionality in hardware or software is typically based on a tradeoff between performance and cost. Each layer in a networking stack may be associated with one or more protocols which define the rules and conventions for processing packets in that layer. Each lower layer may perform a service for the layer immediately above it to help with processing packets, and each layer may add a header (control data) that allows peer layers to communicate with one another. At the sender, each layer may add layer specific headers to the packet as the packet moves from higher layers to lower layers. The receiver may process headers of each layer as the payload moves from the lowest layer to the highest layer.

A data link layer or link layer may refer to a layer that manages a communication channel between adjacent devices in the network. For example, if two routers are connected to each other via a cable, then the link layer may manage the communication channel between these two routers. Ethernet is an example of a link layer. A network layer may refer to a layer that enables communication between any two devices across the network. Internet Protocol (IP) layer is an example of a network layer that enables communication between two routers in an IP network.

Figure 2:
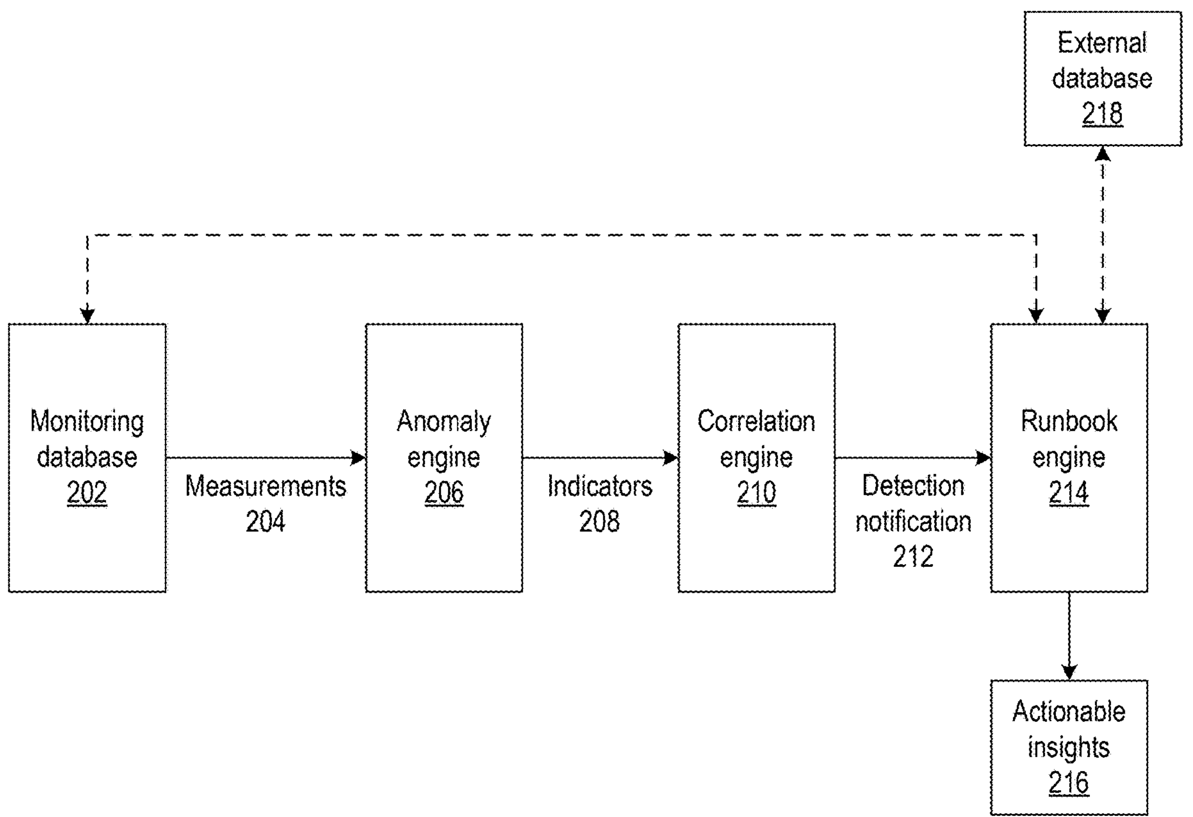
FIG. 2 illustrates an analytics-correlation-runbooks pipeline in accordance with some embodiments described herein.

FIG. 2 illustrates an analytics-correlation-runbooks pipeline in accordance with some embodiments described herein.

Objects (which may include, but are not limited to, users, devices, applications, and networks) may be monitored in a computing infrastructure and a variety of metrics may be collected for each monitored object. For example, a monitoring system may consume data from sensors which may be located across a computing infrastructure. The sensors may consume flow data, packet data and poll network endpoints for their status via Simple Network Management Protocol (SNMP) and other discovery protocols. The term "sensor" may refer to a combination of hardware and software which implements one or more functions (which may include, but are not limited to, gathering and reporting performance metrics). For example, a sensor may be implemented as a set of instructions which are executed by a processor on server 104. Alternatively, a sensor may be implemented as a circuit on device 112.

A variety of monitoring data may be collected from multiple sensors or telemetry sources spread across the network, at multiple time scales, and at multiple levels of detail. The terms "monitoring data" and "measurement data" are used interchangeably in this disclosure. For example, the lowest-level packet flow data may include detailed data about individual network packets and may have a time resolution of milliseconds or less. The packet flow data may be aggregated to create a hierarchy of flow data at progressively greater time scales. For example, packet flow data may be aggregated into first-level flows which may represent sequences of packets from a source to a destination over a time scale of seconds. The first-level flows may be aggregated into second-level flows at a time scale of minutes, and the second-level flows may be aggregated into third-level flows at a time scale of tens of minutes or hours, and so forth.

The monitored data may be stored in a monitoring database 202, which may be distributed, e.g., the data may be stored across multiple computer and/or database systems. For example, monitoring database 202 may store aggregated data in a central repository (e.g., a main database), and may store low-level data closer to the collection source which may be retrieved on-demand. In other words, monitoring database 202 may provide the ability to drill-down from the high-level aggregated data down to the low-level data as needed.

The data stored in monitoring database 202 may be analyzed to detect anomalies (which may also be referred to as indicators in this disclosure) by anomaly engine 206. In this disclosure, the term "engine" may refer to a set of instructions which may be executed on a processor. Thus, an anomaly engine may be implemented using a set of instructions which are executed on a processor. An abnormal spike or dip in measurements 204 may be identified as an anomaly. In some embodiments described herein, an anomalous event (or indicator) may be reported by anomaly engine 206 if multiple anomalies are observed within a specified time duration. Specifically, anomaly engine 206 may create a time series profile for a monitored metric based on historical data. The time series profile may account for seasonality, e.g., the time series may account for the expected variation in the monitored metric during the hours of a day or the days of the week. Anomaly engine 206 may use the time series profile to generate a forecast (e.g., based on the Holt-Winters approach) and a prediction interval around the forecast. The forecast and the prediction interval may represent the range of normal values of a monitored metric at any given time. An outlier may be detected by anomaly engine 206 if one or more measurements 204 of a performance metric are outside the prediction interval. In some embodiments described herein, anomaly engine 206 may generate an indicator (e.g., indicators 208) if one or more outliers are detected within a specified time duration.

Indicators 208 generated by anomaly engine 206 may be provided to correlation engine 210 for further processing. In some embodiments described herein, correlation engine 210 may correlate multiple anomalies to identify network-wide events. For example, a denial-of-service attack event may be identified by correlation engine 210 based on detecting anomalously high traffic to a set of web servers. As another example, a worm which is spreading through a network may generate a set of anomalies which form a tree pattern. Specifically, a pattern of anomalies may be defined for each network event in a set of network events (e.g., a pattern of anomalies which is expected to occur during a denial-of-service attack). A set of anomalies detected in the network may be analyzed by correlation engine 210 to determine if the set of anomalies fits one or more patterns. If the set of anomalies fit a pattern, then correlation engine 210 may generate a detection notification (e.g., detection notification 212) for the corresponding network event.

Detection notification 212 may trigger runbook engine 214 to execute a runbook. The term "runbook" may generally refer to a set of commands or procedures which may be executed on the occurrence of a trigger. The commands or procedures in a runbook may be executed in user mode or superuser mode as needed. Multiple runbooks may be linked together through condition statements. For example, after the completion of a runbook, a conditional statement may be evaluated, and if true, another runbook may be executed. Arbitrarily complex business processes may be implemented using one or more runbooks which may be interlinked with each other using conditional statements. Executing the runbook may generate actionable insights 216, which may be presented to the user. Executing the runbook may also result in no actionable insights. In such situations, no alerts or insights are generated for the user, thus reducing alert fatigue.

Runbook engine 214 may query monitoring database 202 or external database 218 to collect additional data based on the set of commands or procedures specified in the runbook. Specifically, the additional data collected from monitoring database 202 or external database 218 may be data other than the data which was used to generate the indicator (e.g., indicators 208) and the detection notification (e.g., detection notification 212), and which triggered the runbook. In other words, monitoring database 202 may include a set of data. A subset of the set of data may be used to generate an indicator, a detection notification, and to trigger a runbook. While executing the runbook, runbook engine 214 may collect data from monitoring database 202 which is not in the subset of data which was used to generate the indicator and the detection notification and to trigger the runbook. External database 218 may refer to a database which is separate from monitoring database 202 and includes data which is different from the data stored in monitoring database 202. In some embodiments described herein, runbook engine 214 may use a property or parameter associated with an object stored in monitoring database 202 to query external database 218. The result of the query may then be used to determine whether an actionable insight is to be generated.

Figure 3:
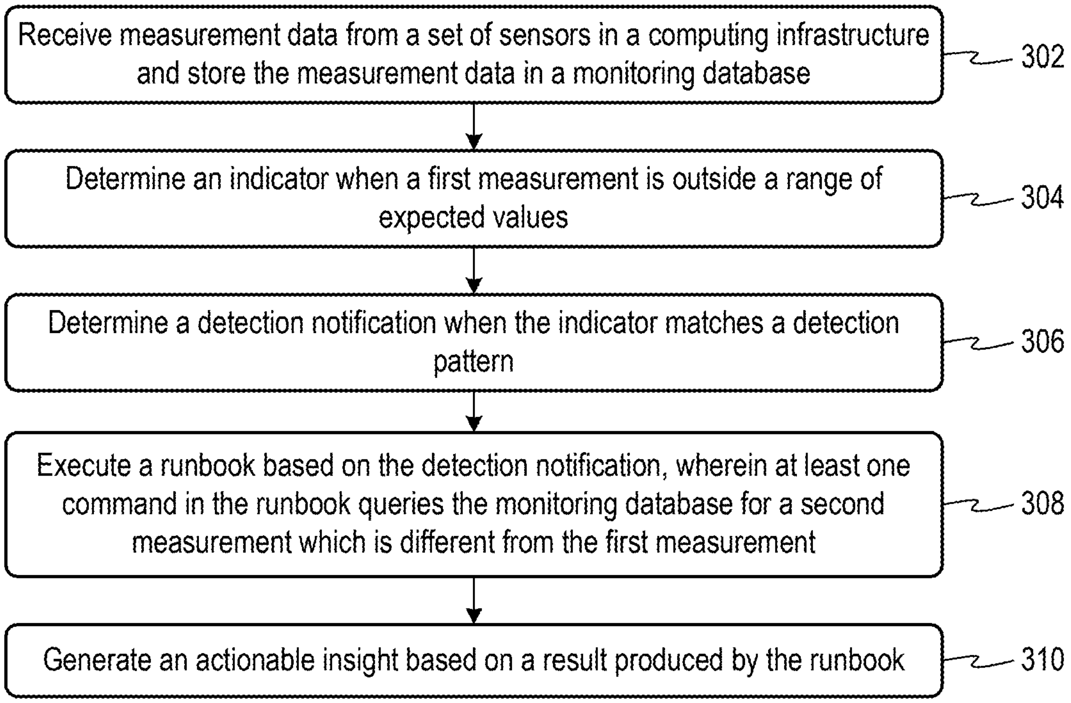
FIG. 3 illustrates a process for generating actionable insights based on an analytics-correlation-runbooks pipeline in accordance with some embodiments described herein.

FIG. 3 illustrates a process for generating actionable insights based on an analytics-correlation-runbooks pipeline in accordance with some embodiments described herein.

Measurement data may be received from a set of sensors in a computing infrastructure and stored in a monitoring database (at 302). The monitoring database (e.g., monitoring database 202) may be distributed over multiple databases. Aggregated measurement data may be stored in a main database and low-level measurement data may be stored in a set of distributed databases. The main database may present a query interface which may retrieve low-level measurement data on an on-demand basis.

An indicator may be determined when a first measurement is outside a range of expected values (at 304). A time series profile may be created (e.g., by anomaly engine 206) for a measurement or monitored metric based on historical measurement data. The time series profile may be used to generate a forecast and an interval around the forecast. An indicator may be generated if the first measurement is outside the interval for a specified number of times within a specified time duration.

A detection notification may be determined when the indicator matches a detection pattern (at 306). Multiple indicators generated by an anomaly engine (e.g., anomaly engine 206) may be correlated to identify network-wide events. Specifically, a pattern of anomalies or indicators may be defined for each network event in a set of network events. A set of indicators reported by the anomaly engine 206 may be analyzed by correlation engine 210 to determine if the set of indicators fits one or more pre-defined patterns. If the set of indicators fit a pattern, then correlation engine 210 may generate a detection notification (e.g., detection notification 212).

A runbook may be executed based on the detection notification, wherein at least one command in the runbook queries the monitoring database for a second measurement which is different from the first measurement (at 308). An actionable insight may be generated based on a result produced by the runbook (at 310).

As one example, consider a situation where several users experience application response time degradation in a particular location. Monitoring database 202 may store application response times. Anomaly engine 206 may use the time series of the application response time to generate a forecast and an interval around the forecast. An indicator may be generated when the application response time falls outside the predicted interval. Correlation engine 210 may determine that multiple indicators generated by anomaly engine 206 match a predefined pattern and may generate a detection notification which may specify a specific application and a location. The detection notification may trigger a runbook which may be executed by runbook engine 214. The runbook may instruct runbook engine 214 to query external database 218 to determine whether the location specified in the detection notification has an ongoing maintenance in progress. For example, runbook engine 214 may query a configuration management database for open tickets based on the location specified in the detection notification. The term "configuration management database" may refer to a database which stores configuration information for a computing infrastructure. The information stored in a configuration management database may include, but is not limited to, hardware, software, systems, and facilities in the computing infrastructure. If the configuration management system does not find any open tickets, then runbook engine 214 may generate an actionable insight. On the other hand, if the configuration management system finds one or more open tickets at the location which are likely causes for the application response time degradation, then the runbook may instruct runbook engine 214 to annotate the open ticket, which may cause the configuration management database to remind affected users about the maintenance. In this case, no actionable insight may be generated because the application response time degradation is not a new alert or event but is instead related to an open ticket. In some embodiments described herein, an actionable insight may be generated which notifies the user that an open ticket in configuration management database has been annotated.

As another example, consider a situation where there is a problem with a router in the computing infrastructure. The router's metrics may be collected and stored in monitoring database 202. For this example, suppose the up/down status of every router in the network is being collected and stored in monitoring database 202. When the router goes down, anomaly engine 206 may detect an anomaly (e.g., an outlier in the time series which should always shows the router status as "up") and may generate an indicator. Correlation engine 210 may generate a detection notification (in this example it is assumed that the router issue is an isolated incident) based on the indicator. The detection notification may cause a runbook to be triggered. At the beginning of the runbook, runbook engine 214 may have the following information: the router identifier and the fact that it is down.

The first job of the runbook may be to assess the impact of the router being down. For example, the runbook may instruct runbook engine 214 to execute commands or procedures to determine out how many users are affected by the router outage. Specifically, runbook engine 214 may query monitoring database 202 to determine the traffic that was flowing through the router before it went down. It is noted that this data was not used to generate the detection notification which triggered the runbook. Moreover, it is noted that this data may be stored by a different sensor or telemetry source from the one which generates and/or collects the router status data. Specifically, the router identifier and the time when the status of the router changed to down may be used to query the traffic data for a time duration just prior to when the router went down. As the next step, the runbook may also try to see if the traffic carried by the router can be found somewhere else on the network at present. In other words, if the traffic is still there, then it may be concluded that some kind of failover rerouting must have taken place. For example, runbook engine 214 may perform another query to monitoring database 202 to check if the traffic which was flowing through the failed router is still flowing through the network. The runbook may also try to assess if any of the end user machines were affected by the router. For example, the runbook may collect end user performance metrics before and after the outage to determine if there was any degradation in performance. This query may utilize yet another set of sensors and/or telemetry sources which are different from the sources which keep track of router status and traffic flow. Based on the received data, the runbook engine 214 may determine whether to create an actionable insight.

In yet another example, consider a situation when an interface is congested on one of the interfaces. The original congestion could be identified by tracking some of the key metrics for the interface in question: utilization of the interface or maybe the percentage of packet retransmissions on the interface. This data could be collected by a first sensor and stored in monitoring database 202. By tracking these metrics, anomaly engine 206 may generate an indicator when congestion starts. In this example, it is assumed that this is the only problem in the computing infrastructure and so correlation engine 210 may generate a detection notification with this one indicator and a runbook may be triggered. The runbook may instruct runbook engine 214 to issue a query to monitoring database 202 to obtain the locations of the IP addresses which are going through the interface. The response for this query may be generated based on data which is collected by a second sensor which is different from the first sensor. The response may specify the locations of the client. Based on the response, the runbook may decide whether the affected locations are business critical and if so, raise a high priority alert. On the other hand, if the location is not critical, then no actionable insight or incident may be created, or a low priority incident may be created.

Figure 4:
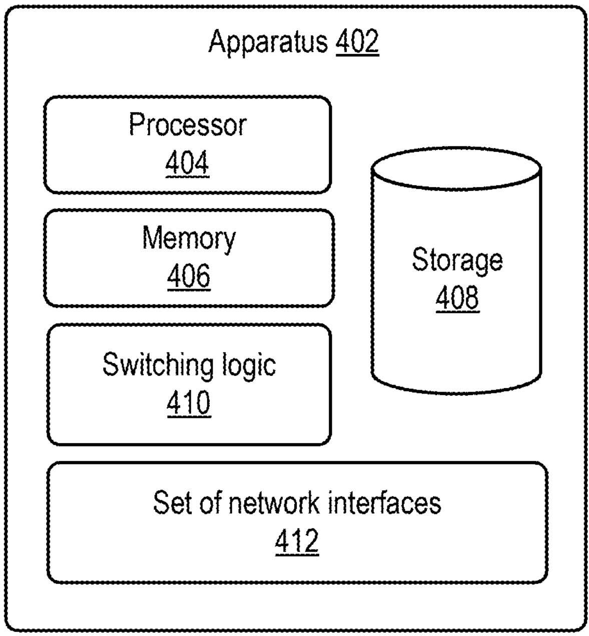
FIG. 4 illustrates an apparatus in accordance with some embodiments described herein.

FIG. 4 illustrates an apparatus in accordance with some embodiments described herein.

Apparatus 402 (e.g., a device, a file server, etc.) can include processor 404, memory 406 (e.g., a volatile or non-volatile random access memory), and storage 408 (e.g., a flash memory device or a disk drive). Storage 408 can store data and executable code. The components in apparatus 402 can communicate with one another using a communication mechanism (not shown in FIG. 4), e.g., a bus, a backplane, and/or a switching fabric. Executable code stored in storage 408 can include instructions that, when executed by processor 404, cause apparatus 402 to perform one or more methods that are implicitly or explicitly described in this disclosure. Storage 408 can also store any data that is required by any processes that are performed by apparatus 402.

Apparatus 402 can also include switching logic 410 and set of network interfaces 412. Set of network interfaces 412 can be used to transmit data to and/or receive data from other communication devices. Switching logic 410 can forward network traffic received on one or more network interfaces in accordance with switching/forwarding/routing information stored in apparatus 402. Specifically, switching logic 410 can be configured by processor 404 in accordance with one or more methods that are implicitly or explicitly described in this disclosure.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:

storing, in a monitoring database, measurement data received from a set of sensors in a computing infrastructure;

determining, by an anomaly engine, an indicator when at least a first measurement of a monitored metric is outside a range of expected values, wherein the anomaly engine creates a time series profile for the monitored metric based on historical measurement of the monitored metric, and wherein the range of expected values is generated based on the time series profile for the monitored metric;

determining, by a correlation engine, a detection notification when the indicator matches a detection pattern;

executing, by a runbook engine, a runbook based on the detection notification, wherein at least one command in the runbook queries the monitoring database for a second measurement which is different from the first measurement; and generating, by a processor, an actionable insight based on a result produced by the runbook.

2. The method of claim 1, wherein the monitoring database includes a main database and a set of distributed databases, and wherein aggregated measurement data is stored in the main database and low-level measurement data is stored in the set of distributed databases.

3. The method of claim 1, wherein the correlation engine defines a set of detection patterns corresponding to a set of network events.

4. The method of claim 1, wherein at least one command in the runbook queries an external database which is different from the monitoring database.

5. The method of claim 4, wherein the external database is a configuration management database.

6. The method of claim 5, wherein the runbook annotates an open ticket in the configuration management database.

7. A non-transitory computer-readable medium comprising stored instructions, which when executed by a processor, cause the processor to:

store, in a monitoring database, measurement data received from a set of sensors in a computing infrastructure;

determine, by an anomaly engine, an indicator when at least a first measurement of a monitored metric is outside a range of expected values, wherein the anomaly engine creates a time series profile for the monitored metric based on historical measurement of the monitored metric, and wherein the range of expected values is generated based on the time series profile for the monitored metric;

determine, by a correlation engine, a detection notification when the indicator matches a detection pattern;

execute, by a runbook engine, a runbook based on the detection notification, wherein at least one command in the runbook queries the monitoring database for a second measurement which is different from the first measurement;

and generate an actionable insight based on a result produced by the runbook.

8. The non-transitory computer-readable medium of claim 7, wherein the monitoring database includes a main database and a set of distributed databases, and wherein aggregated measurement data is stored in the main database and low-level measurement data is stored in the set of distributed databases.

9. The non-transitory computer-readable medium of claim 7, wherein the correlation engine defines a set of detection patterns corresponding to a set of network events.

10. The non-transitory computer-readable medium of claim 7, wherein at least one command in the runbook queries an external database which is different from the monitoring database.

11. The non-transitory computer-readable medium of claim 10, wherein the external database is a configuration management database.

12. The non-transitory computer-readable medium of claim 11, wherein the runbook annotates an open ticket in the configuration management database.

13. A system, comprising:

a set of memories storing instructions; and a set of processors, coupled with the set of memories, and to execute the instructions, the instructions when executed causing the set of processors to:

store, in a monitoring database, measurement data received from a set of sensors in a computing infrastructure;

determine, by an anomaly engine, an indicator when at least a first measurement of a monitored metric is outside a range of expected values, wherein the anomaly engine creates a time series profile for the monitored metric based on historical measurement of the monitored metric, and wherein the range of expected values is generated based on the time series profile for the monitored metric;

determine, by a correlation engine, a detection notification when the indicator matches a detection pattern;

execute, by a runbook engine, a runbook based on the detection notification, wherein a first command in the runbook queries the monitoring database for a second measurement which is different from the first measurement, and wherein a second command in the runbook queries an external database which is different from the monitoring database; and generate an actionable insight based on a result produced by the runbook.

14. The system of claim 13, wherein the monitoring database includes a main database and a set of distributed databases, and wherein aggregated measurement data is stored in the main database and low-level measurement data is stored in the set of distributed databases.

15. The system of claim 13, wherein the correlation engine defines a set of detection patterns corresponding to a set of network events.

16. The system of claim 13, wherein the external database is a configuration management database.

17. The system of claim 16, wherein the runbook annotates an open ticket in the configuration management database.

* * * * *